United States Patent [19]
Thyselius et al.

[11] 3,963,871
[45] June 15, 1976

[54] ANALYSIS DEVICE FOR ESTABLISHING THE BINARY VALUE OF ASYNCHRONOUS DATA SIGNALS

[75] Inventors: Per-Olaf Thyselius, Tyreso; Burghardt Herman Josef Vollmer, Handen; Knut Per Johansen, Huddinge, all of Sweden

[73] Assignee: Telefonaktiebolaget L M Ericsson, Stockholm, Sweden

[22] Filed: Aug. 5, 1974

[21] Appl. No.: 494,701

[30] Foreign Application Priority Data
Aug. 10, 1973 Sweden............................ 109688/73

[52] U.S. Cl............................. 179/15 BA; 325/325
[51] Int. Cl.² ........................ H04J 3/02; H04B 1/16
[58] Field of Search....... 179/15 BA, 15 AD, 15 BV, 179/170 T; 178/50, 53.1 R, 53.1 A, 88, 71.8; 307/211, 235 R; 328/41, 48; 325/42, 323, 325

[56] References Cited
UNITED STATES PATENTS

| | | | |
|---|---|---|---|
| 3,112,363 | 11/1963 | Schramel........................ | 178/53.1 R |
| 3,764,989 | 10/1973 | McClellan........................ | 178/50 X |
| 3,851,257 | 11/1974 | Boersma........................... | 328/48 X |

Primary Examiner—Kathleen H. Claffy
Assistant Examiner—E. S. Kemeny
Attorney, Agent, or Firm—Hane, Baxley & Spiecens

[57] ABSTRACT

The present invention relates to an analysis device, for use in a transit exchange for transmission of asynchronous data signals with known character structure and known nominal signalling rate. The character structure comprises a start pulse and a number of data pulses which are sampled in the exchange by means of sampling pulses in synchronism with clock pulses from a clock pulse source several times per data pulse for the establishment of the binary informational content of the data signals. The device includes means through the aid of which a summation is made of the clock pulse occurring during a data pulse with indication signals being delivered at specific clock pulse positions within the data pulse. Means are further included for the summation of sampling pulses with a given binary value, thereby excluding sampling pulses occurring during the initial and final phases of a data pulse and for delivering an indication signal when a specific sum has been reached, and for the generation of a binary signal to indicate the binary value of the data pulse in correspondence to whether said specific sum has or has not been reached.

5 Claims, 7 Drawing Figures

ANALYSIS DEVICE FOR ESTABLISHING THE BINARY VALUE OF ASYNCHRONOUS DATA SIGNALS

This invention pertains to an analysis device for use in a transit exchange for the transmission of asynchronous data signals with known character structure and known nominal signalling rate, which are sampled in the exchange in synchronism with a clock pulse several times per data pulse, for the establishment of the binary informational content of the data signals.

Analysis devices of this type can be realized in different ways. One solution is to use a shift register which can be stepped forward by a timing oscillator, which, on reception of a start pulse forming part of the received character, is started and generates pulses for sampling the mid-point values of the following character elements. The disadvantage of this type of device is that it is sensitive also to brief disturbances in that, if the disturbance occurs at the moment of sampling, the entire informational content of the character element is distorted.

Another possibility is to sample the data signals several times per character element, the sampling values being successively shifted into a memory, usually in a computer, so that analysis of the character as a whole can take place as soon as the start and stop pulses associated with the character are present in specific memory positions. Typical of this type of device is, accordingly, that the received characters can be delivered onward by the analysis device only after they exist in their entirety in a memory. This circumstance is not particularly troublesome in a data processing system but has great disadvantages if the analysis device is used in transit exchanges, e.g. in a TELEX network. The transmission time for a connection comprising a number of transit points will in such case be considerable and may be of the order of seconds.

An object of the invention is to produce an analysis device which does not possess the aforementioned inconveniences. The invention relies on the fact that the establishment of the binary value is based on a number of samples within a limited part of each received character element and is determined by a majority decision, and on the fact that the analysis device carries out the determination, element by element, and forwards the character elements as soon as the determination has been made.

According to a further development of the invention a separate analysis is made of the initial phase of the start pulses in order to establish that a start condition is received on the transmission circuit during a significant part of the initial phase before an additional analysis of the binary value is made as stated above. The characteristics of the invention will appear from the claims.

The invention is included within a TELEX switching exchange connected to subscriber lines and using known time division multiplex techniques wherein conventional multiplexers are connected via a detector (Analysis) device, the switch memories of a control equipment and an intermediate or buffer memory to conventional demultiplexers.

The inventions of copending applications Serial Nos. 491,274 and 491,298 are directed to details of the intermediate memory and the control equipment while the present invention is directed to the detector device also called herein an analysis device. Generally, the invention contemplates apparatus for indicating the binary value of a data element which is represented by a signal switching from a first state to a second state and, after a duration of time, switches from the second state to the first state. The apparatus includes means for generating sampling pulses periodically recurring at a rate such that a plurality of such pulses occur while the signal representing the data element is in the second state, sensing means for sensing for the transition of the signal representing the data element from the first state to the second state and interval generating means connected to the sensing means for generating a given time interval related to a nominal duration of time the signal representing the data element should be in the second state. Counting means count the number of sampling pulses occurring only when the signal representing the data element is in the second state, and means connected to the counting means and the interval generating means transmit a particular binary value indicating signal at the end of the given time interval only if the number of sampling pulses counted by the counting means during the given time interval is greater than a certain value.

The invention is explained below with the aid of an embodiment with reference to the attached drawing, in which.

Figure 1:
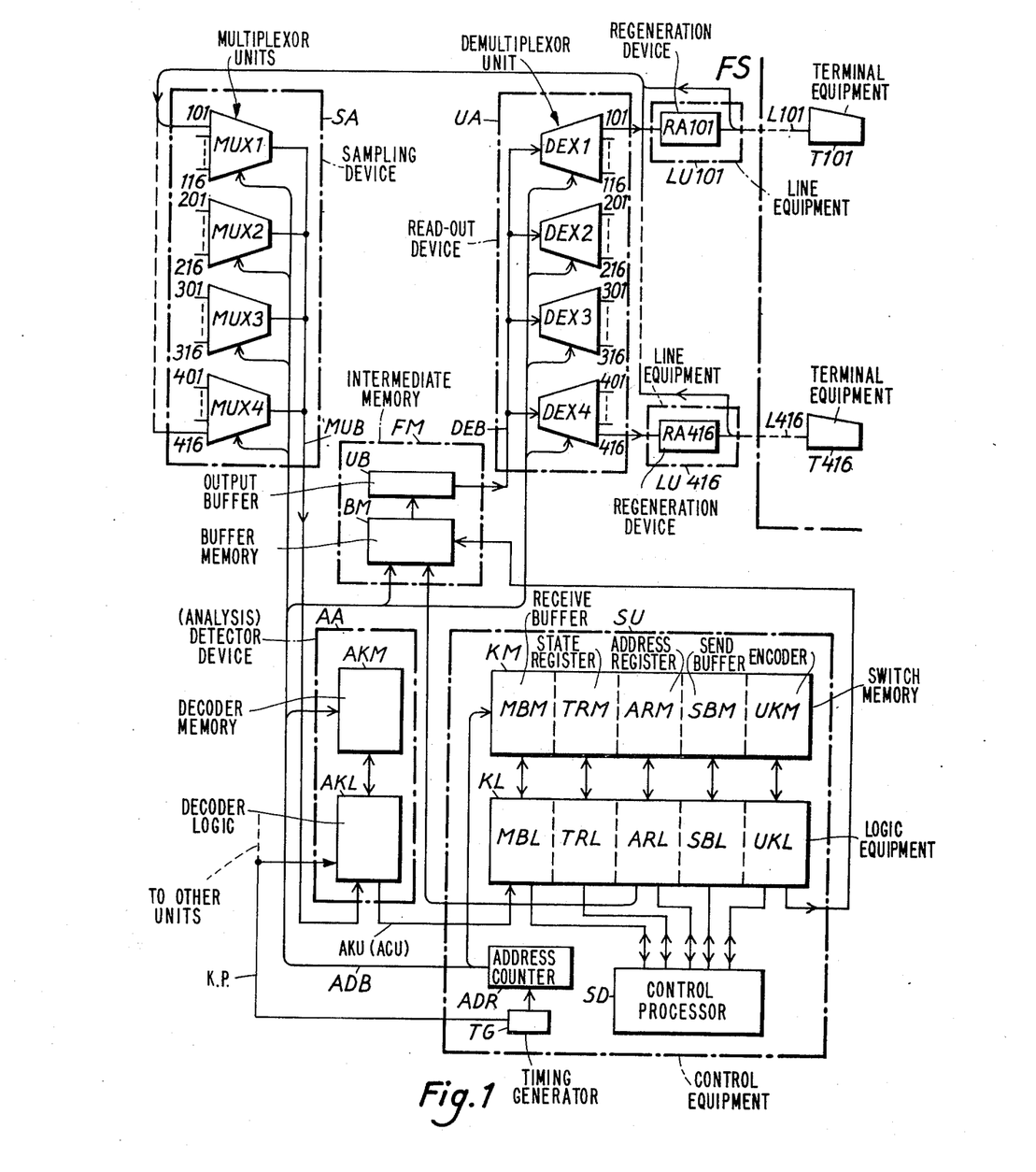
FIG. 1 shows a transit exchange for the switching of TELEX signals, in which an analysis device according to the invention can suitably be used.

FIG. 1 shows a transit exchange FS to which $4 . 16 = 64$ terminal equipments T 101 – T 416 are connected on their respective circuits L 101 – L 416 and associated line equipments LU 101 – LU 416. All terminal equipments are assumed to work at the asynchronous modulation rate of 50 bauds and utilize a character structure and signalling scheme according to the international TELEX standard. This implies that every character signal comprises seven binary character elements, of which the first constitutes the start element and the last the stop element, and the five intermediate elements are information-carrying data elements. The standard structure also implies that the nominal length of each of the first six elements corresponds to a unit interval of 20 ms, while the stop element is prolonged to normally 1.5 unit intervals = 30 ms. The resulting nominal character speed will therefore be $50/7.5 = 6.67$ characters/s. With manual transmission from a terminal, however, the average character speed will be lower, which is noticeable through the fact that the stop elements will at times be further prolonged. Typical of the asynchronous method of transmission, therefore, is that the phase position of a character element is correlated only to the phase position of the other elements within the same character and that the receiver must derive the element phase from each start element and change to a waiting condition during every stop element.

Each of the 16 line equipments, e.g. LU 101 – LU 116, is connected to a multiplexor unit, e.g. MUX 1, and to a demultiplexor unit, e.g. DEX 1, the purpose of which is, in selected time slots, to through-connect a circuit to an incoming bus MUB and to an outgoing bus DEB. The multiplexor units MUX 1–4 together constitute a sampling device SA for the values of the incoming signals, and the demultiplexor units DEX 1–4 together constitute a read-out device UA for transmission of indication values relating to the values of the outgoing signals to a regeneration device RA in each line equipment, as will be described in greater detail. In addition to the regeneration device the line equipments contain circuits of conventional type for translation between the signal representations used on the line and exchange sides respectively.

Figure 2:
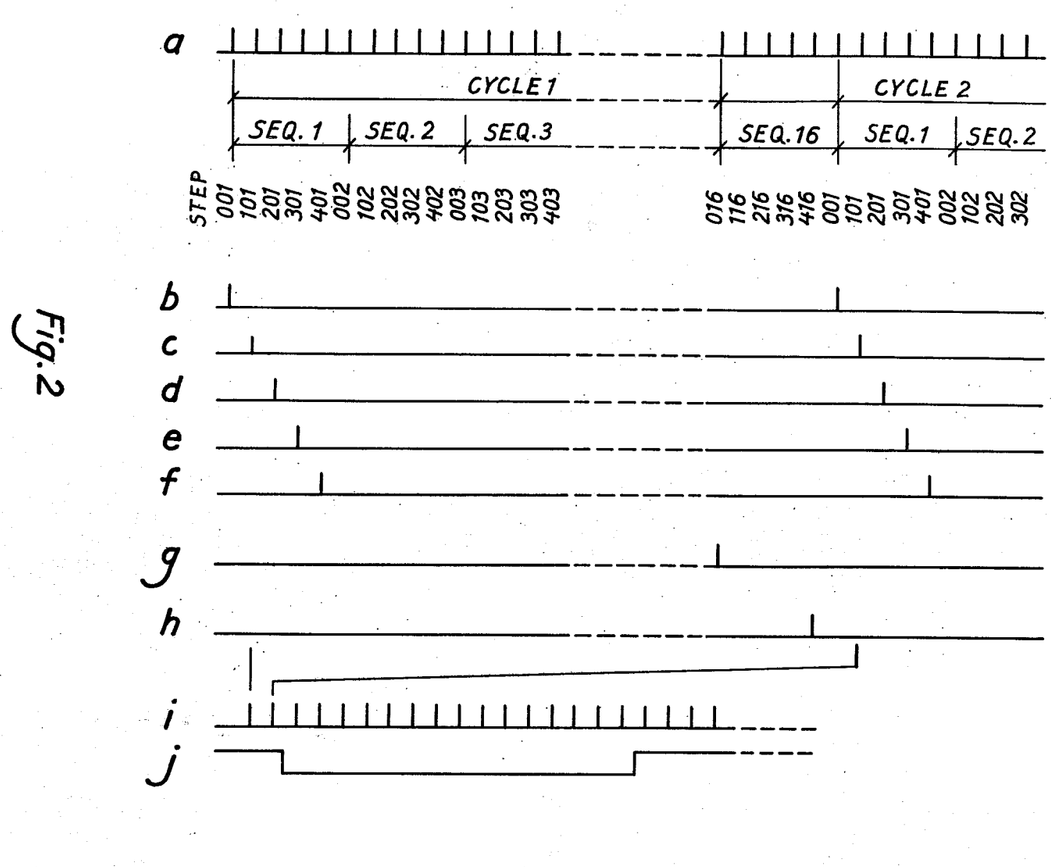
FIG. 2 shows a number of timing diagrams which illustrate the mode of operation of the transit exchange.

On the busses MUB and DEB the character elements which were received and sent, respectively, via the LU units are transmitted in the form of sampling and indication values, respectively, in a time sequence determined by an address counter ADR and with a density determined by a timing generator TG, e.g. 15 per unit element and line. See the timing diagram in FIG. 2, lines (a), (c), (i) and (j). Interconnection of a calling terminal equipment, the A subscriber, with the desired other terminal equipment, the B subscriber, takes place in a central switching equipment comprising a control equipment SU with a control processor SD. The switching equipment also comprises a buffer memory BM connected to an output buffer UB, which form part of an intermediate memory FM, and a switch memory KM, in which received character elements are temporarily stored while being processed by a logic equipment KL. The logic equipment comprises the subunits MBL, TRL, ARL, SBL and UKL, which interwork with their respective associated memory fields in memory KM - viz. MBM, TRM, ARM, SBM, UKM - as will be described in greater detail. The transit exchange also contains a detector device AA which, on the basis of the sampling values, establishes the informational content of the received signals and, depending on the value established, produces a binary indication signal.

The device comprises a decoder memory AKM and a decoder logic AKL, as will be described in greater detail.

Each memory field in the switch memory, as also the decoder memory and buffer memory, has 64 memory positions corresponding to each of the 64 line equipments, and these positions are addressed at the same time as the respective line equipment obtains access to the busses MUB and DEB for writing into the decoder memory and reading out from the output buffer of the associated sampling and indication values, respectively. The addressing takes place cyclically and every addressing cycle, in order to facilitate the read-out from the intermediate memory to the read-out device, is divided into 16 sequences of five steps each. During the first of the five steps four indication values are transmitted from the buffer memory BM to the output buffer UB, each relating to a line equipment in its respective 100-line group, e.g. LU 101, LU 201, LU 301 and LU 401. During the other four steps in the same sequence addressing of these line equipments takes place, the sampling and indication values being transmitted from and to them, respectively, via the busses MUB and DEB respectively. This will be seen from FIG. 2, lines (b) – (f).

When the A subscriber's terminal, e.g. terminal T 101, is in its rest position, the sampling values occurring during addressing stage No. 101 on bus MUB represent a binary zero. On receipt of a call the state changes to binary 1, whereupon the decoder logic AKL is activated and stores information concerning the event in the corresponding position in the decoder memory AKM. After 15 sampling values have been recorded, which correspond to one unit interval, the informational content of the element is evaluated. If it is found to be 1, it is transferred via the logic unit MBL to the memory position of the A subscriber in the receive buffer MBM, after which the next unit interval is scanned, and so on. In the receive buffer seven signal elements, corresponding to the length of a TELEX character, are stored and, if all are 1, a call indication is transferred to the logic unit TRL for updating of the memory position of the A subscriber in the state register TRM, at the same time as the A subscriber's address is written into the corresponding position in the address register memory ARM. An acknowledgement of the call, independent of the control processor, is also made in such manner that output data to the A subscriber are changed from 0 to 1 by writing into the buffer memory BM in the manner described later.

The call indication is also transferred to the control processor SD, which identifies the A subscriber by means of the information in the address register. If the control processor is prepared to receive selection information from the A subscriber, the TELEX character G is first written into the A subscriber's position in the send buffer memory SBM, from which it is fetched, element by element, by the encoder logic UKL, and is stored in the associated memory UKM. From there indication pulses, the values of which represent the respective character elements, are transferred to the A subscriber's position in the buffer memory BM, from which, via the output buffer UB, they are fed on bus DEB and, in the A subscriber's time slot, directed through the demultiplexor DEX 1 to line equipment LU 101. Here, with the aid of the regeneration device RA 101, the indication values are combined into character elements which are transmitted on line L 101. When the entire character G has been collected from the send buffer, the control processor writes the character A, the second character in the signal GA (Go Ahead), which is also sent to the A subscriber. The control processor marks in the state register that this phase in the procedure has been completed.

The A subscriber is now expected to send selection information in the form of a specific number of TELEX characters, identifying a B subscriber (or a special service), within a specified period of time. If this transmission does not take place, the control processor SD initiates clearing of the A subscriber by restoring the output data to 0 and restoring the A subscriber's memory word in the switch memory. If, on the other hand, selection information arrives, the characters are analysed, element by element, by the decoder logic AKL and combined in the receive buffer MBM as previously described, from which the characters are fetched one at a time by the control processor SD. When the necessary number of characters has been received for identification of the B subscriber, the control processor enters the corresponding position in the state register TRM and investigates whether the subscriber is accessible. If not, this is notified to the A subscriber in the form of a number of characters, a so-called service signal, after which the A subscriber is cleared. If the B subscriber is accessible, the control processor writes the call state into the state register, after which output data in the B subscriber's memory position in the buffer memory BM are changed from 0 to 1, implying a call signal to the B subscriber's terminal, e.g. terminal T 416. During the first addressing step in the sequence in which line equipment LU 416 is addressed, i.e. during step 016, the indication values of the call signal are transferred to the output buffer UB, whence, during addressing step 416, they are transmitted via bus DEB and demultiplexor DEX 4 to line equipment LU 416 for combination into a continuous signal in regeneration device RA 416.

When answering, the terminal T 416 executes a shift from 0 to 1 in the direction towards the transit exchange, which, after being decoded, is notified to the control processor SD via the receive buffer MBM. The control processor writes a connect-through message CT in the send buffer positions of both subscribers and, when this signal has been transmitted, the fact is marked in the state register TRM and at the same time the information in the address register ARM is changed. Hitherto the memory position of each subscriber in the address register has addressed its own line equipment but, on connect-through, these addresses are reversed. Furthermore the through-connection has the result that the character elements which are decoded in the decoder are directly transmitted to the encoder for storage in the encoder memory. The receive buffer, however, continues to receive all elements in order to be able to detect a clearing signal from either the A or B subscriber. The reversal of the addresses in the address register has the result that the indication values read out of the encoder memory in the A subscriber's memory position can be written into the B subscriber's memory BM position in the buffer memory, and vice versa. The through-connection thus takes place by change of the time slot on transmission from switch memory KM to buffer memory BM.

The request for clearing consists of the continuous transmission of 0 by either terminal. When the receive buffer MBM finds a character with solely 0 elements, this is noted in the state register TRM, while the control processor SD identifies the associated addresses. Both terminals are then cleared and the associated memory positions in the address register ARM are zeroed.

The above described connecting and clearing process in itself does not constitute an object of the invention but is described here solely in order to present a more complete picture of the mode of operation of the transit exchanges. The processor may be a real time computer of any known type used in telecommunications.

The basic principle of the invention is most simply explained by description of a device for analysis of TELEX characters arriving from a single subscriber line, the analysis device being supplied with character elements via a sampling device of known type.

Figure 3:
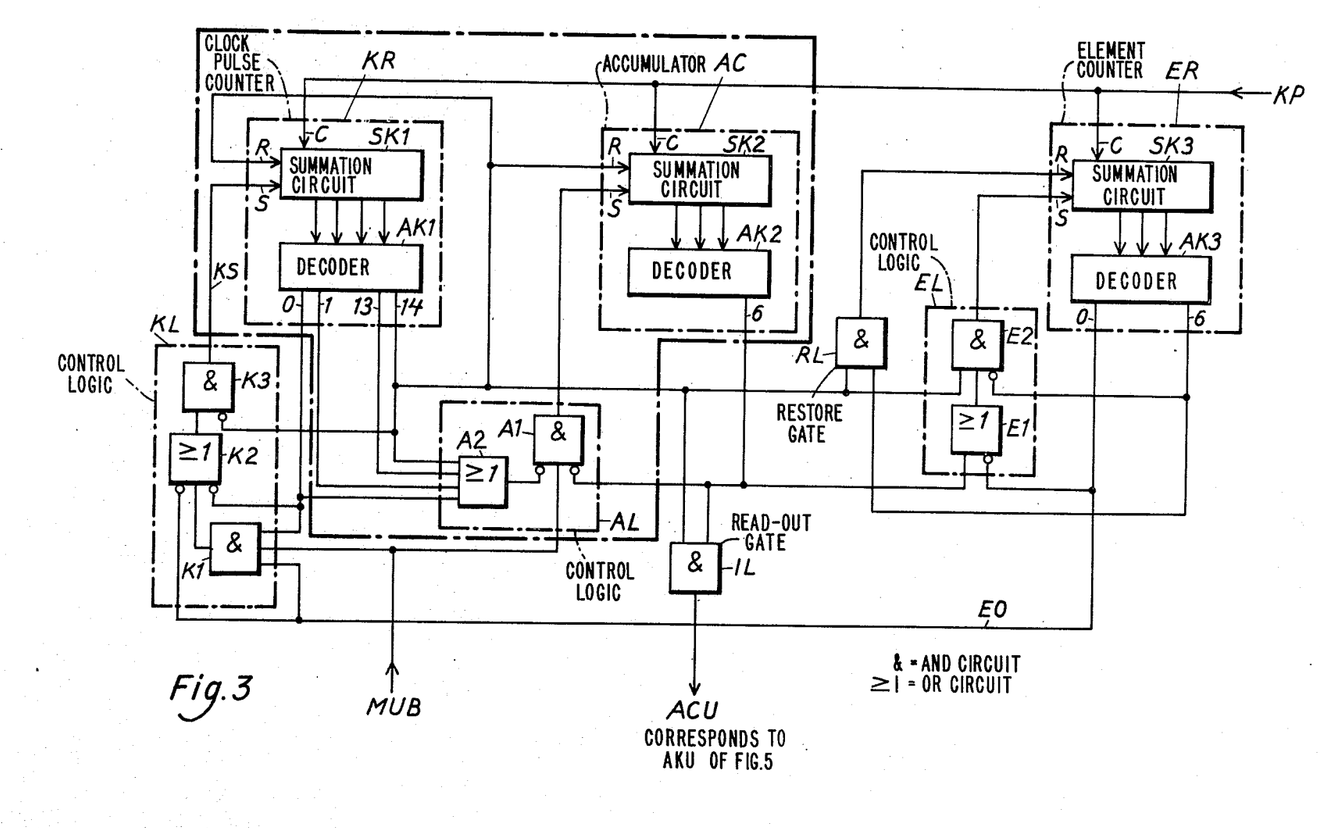
FIG. 3 is a circuit diagram of the device according to the invention with circuits in accordance with said further development.

FIG. 3 shows an analysis device made up of simple logic elements and composite logic circuits. The latter consist of binary counters and decoders, which can be realized by means of generally available IC circuits of standardized type, e.g. SN 74161 and SN 74154 respectively.

The device consists of a clock pulse counter KR, comprising a 4-bit summation circuit or unit adder SK 1 and a decoder AK 1 with associated control logic KL, and of an accumulator AC, comprising a 3-bit summation circuit or unit adder SK 2 and a decoder AK 2 with associated control logic AL, and of an element counter ER, comprising a 3-bit summation circuit or unit adder SK 3 and a decoder AK 3 with associated control logic EL. The device in FIG. 3 also contains a read-out gate IL and a restore gate RL.

The three counters are stepped by clock pulses which arrive on line KP from the timing generator TG shown in FIG. 1 and are taken to input C of the respective summation circuit. The stepping takes place in dependence on control conditions on the other two inputs, marked S and R, in the manner that the binary condition 1 on input S causes the summation circuit to add the value 1 to its content, while the condition 1 on input R causes the summation circuit to be zeroed. The binary condition 0 on the respective inputs prevents the clock pulses from actuating the circuit. With the aid of the respective decoders the binary number registered in the respective summation circuit is read out. The values indicated by the decoder outputs when they assume the binary state 1 are shown by decade numbers in FIG. 3.

Simple logic elements in the device consist of AND gates and OR gates, each with two to four inputs, of which one or two may be inverting. Inverting is marked by a small ring and implies that the activation condition on the input is 0. The gate network formed by the gates has connection both to the input bus MUB and to the output ACU. Sampling pulses representing the binary value of the character elements received on the subscriber's line arrive on bus MUB, in time with the clock pulses on KP, and indication signals relating to the analysed values of the respective character elements are delivered on bus ACU.

The function of the device will be described with reference to the timing diagrams in FIG. 4 where on line (a) are shown the clock pulses on line KP, on line (b) a TELEX character as it arrives from the subscriber's line, and on line (c) the sampling pulses obtained on line MUB. As is seen, the A states on line (b) are reproduced by positive pulses representing the binary value 1 on line (c), which coincide in time with the pulses on line a). The repetition frequency for the pulses is 750 Hz, i.e. 15 times per unit element of the TELEX characters. It is assumed in the example that the start element, which follows after the first switch-over from Z to A state, has been received in distorted form, the element having a polarity error during part of its extent, and has also a shorter duration than normal, as is indicated by dotted lines.

The starting position is that all summation circuits are zeroed and this state persists as long as the state on input bus MUB is 0. Thus the AND gates K 1 and A 1 in the logic circuits KL and AL, respectively, are directly blocked by 0 on MUB, so that the S inputs to the summation circuits SK 1 and SK 2 will have the state 0. The counter ER is actuated in dependance of the counters KR and AC, as will appear later.

According to the preceding account the zero condition of the respective summation circuits is represented by the state 1 on the output marked 0 from associated decoders. The AND gate K 1 in KL has therefore two of its inputs activated, while the subsequent OR gate K 2 is for the present inhibited, and thus also the AND gate K 3.

Figure 4:
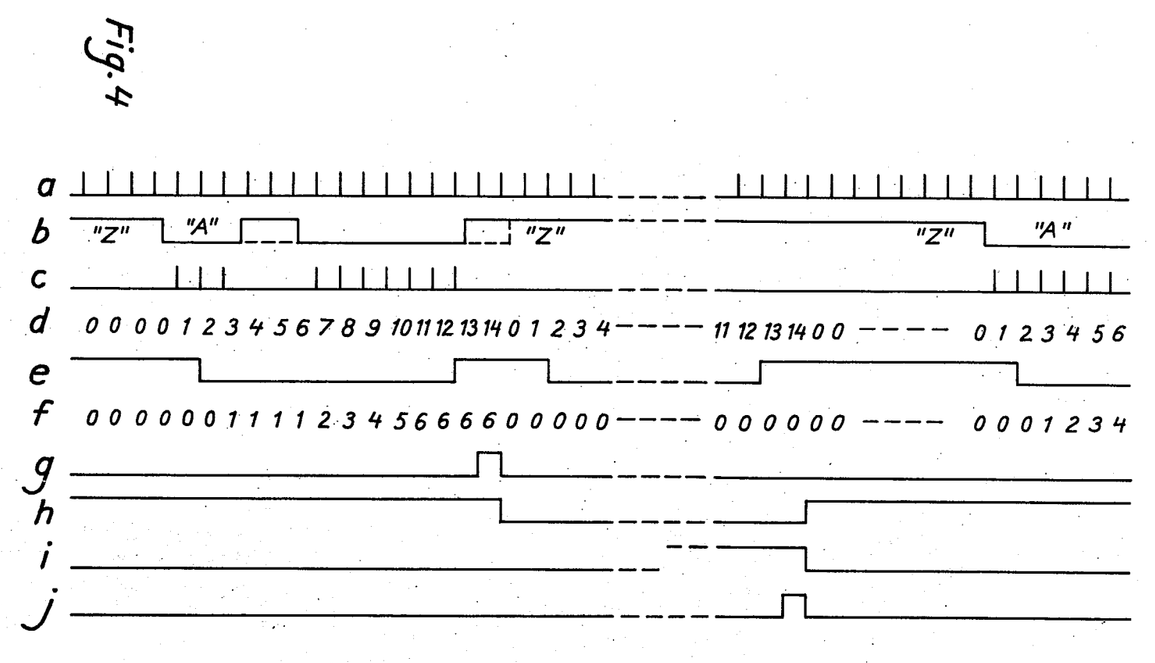
FIG. 4 shows a number of timing diagrams for illustration of the function of the device.

As soon as the first 1 pulse according to line (c) in FIG. 4 appears on the input line MUB, the necessary activation conditions will be fulfilled for the circuit KL, so that input S to the summation circuit SK 1 will have 1 state. The clock pulse appearing simultaneously on input C causes stepping of unit adder SK 1 to position 1, as is shown on line (d), which results in the shift of output 0 of decoder AK 1 to 0 state, while output 1 will have 1 state. The 0 state on the 0 output causes the OR gate K 2 to be activated at the same time as the AND gate K 1 is blocked. The S input to the summation circuit SK 1 will in this way have the 1 state irrespective of the state on the input MUB, so that, according to line (d) in FIG. 4, SK 1 will be stepped in time with the clock pulses.

As long as summation circuit SK 1 is in position 0 or 1, the AND gate A 1 in control logic AL is blocked since 1 state is delivered via the OR gate A 2 to one of its inverting inputs, as is shown on line (e) in FIG. 4. The other inverting input is activated by 0 from the output marked 6 from the decoder AK 2. The non-inverting input on gate A 1 is activated by the 1 pulses on input MUB and, when the inhibition condition disappears when summation circuit or unit adder SK 1 reaches position 2, input S to the summation circuit or unit adder SK 2 will have 1 state so that, according to line (f), unit adder SK 2 is stepped to position 1. During the subsequent three clock pulse intervals there will be no 1 pulses on bus MUB, so that summation circuit circuit SK 2 is not stepped, but SK 1 is stepped and thereby attains position 6. As from the next clock pulse there are again 1 pulses on line MUB, so that both summation circuits are stepped onwards. After five steps, however, the 1 state is obtained on output 6 from the decoder AK 2, which blocks the AND gate A 1, so that circuit SK 2 remains in this position while the summation circuit SK 1 is stepped onward. When it has reached position 13, the inhibition condition for gate A 1 reappears, as shown on line (e) in FIG. 4. In position 14 the state on output 6 is gated out from the decoder AK 2, in this case 1, through the AND gate IL to the output ACU, as shown on line (g) in FIG. 4. 1 state is also obtained on the R inputs to the summation circuits SK 1 and SK 2, simultaneously with inhibition of the S inputs, so that the circuits are zeroed by the next clock pulse. Furthermore the summation circuit SK 3 is stepped forward since 1 state is delivered to the OR gate E 1 in control logic EL from output 6 in the decoder AK 2 at the same time as the AND gate E 2 has 0 on its inverting input from output 6 of the decoder AK 3 and 1 on a non-inverting input from output 14 of the decoder AK 1. With the stepping of SK 3 the state on output 0 from decoder AK 3 shifts from 1 to 0, as shown on line (h) in FIG. 4.

The position accordingly is now that the summation circuits SK 1 and SK 2 are again zeroed but, since the summation circuit SK 3 has left its zero position, the S input to circuit SK 1 will now have 1 state through an activation condition on one of the inverting inputs to the OR gate K 2, so that circuit SK 1 can be stepped irrespective of the state on output 0 from the decoder AK 1 or of the input MUB. The process described above will therefore be repeated cyclically, each cycle comprising 15 clock pulses as long as the state on output 0 from decoder AK 3 is 0.

When six cycles have been completed the summation circuit SK 3 is stepped to position 6, which marks the beginning of the stop element. Output 6 from the decoder AK 3 will then have state 1, as is shown by the higher level on line i) in FIG. 4, whereupon the AND gate E 2 in logic EL is blocked and the restoring circuit RL will have one of its activation conditions fulfilled. When the summation circuit SK 1 next reaches position 14, therefore, input S to the summation circuit SK 3 will not have the 1 state. Instead input R to circuit SK 3 will have 1 state, as shown on line (j), since circuit RL will now be activated, so that circuit SK 3 is zeroed by the next clock pulse simultaneously with circuits SK 1 and SK 2. According to lines h) and (i) in FIG. 4 the state on the outputs from the decoder AK 3 shifts so that output 0 goes to 1 and output 6 to 0. The analysis device has thereby been returned to its original state and is prepared to receive the start element of the next character. On the far right in FIG. 4 is shown the beginning of such an element and the beginning of a new analysis cycle.

In the case described above it is assumed that a positive indication of the start element was obtained. If, however, the distortion of the element had been considerably greater, or if the received A state had not represented a start element at all but consisted of a brief interference, the accumulator AC would not have been able to count a sufficient number of 1 pulses during the summation interval, defined by the lower level on line (e) in FIG. 4, in order to attain position 6. When the clock pulse counter KR reaches the position 14, therefore, the AND gate E 2 in EL will not be activated, so that the element counter ER is not stepped. The result will be that the analysis device returns to its starting position.

An analysis device according to the invention is especially well suited as a centralized equipment in a transit exchange for serving a large number of incoming subscriber lines on the time division principle. An example of such an arrangement is shown in FIG. 5, in which the analysis device comprises a decoder memory AKM, in which data relating to the respective incoming lines are stored while analysis is in progress, and a decoder logic AKL with which the analysis is performed by processing of data stored in memory AKM.

Figure 5:
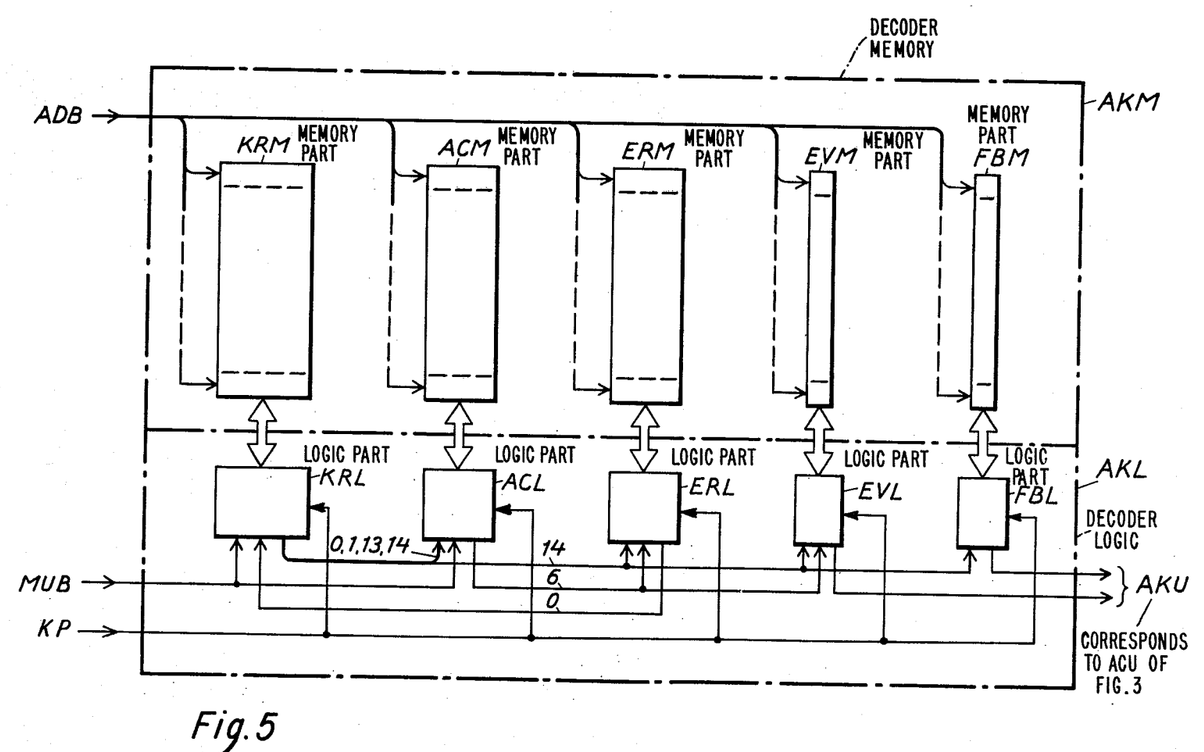
FIG. 5 shows a block diagram of the practical execution of the analysis device according to FIG. 1.

As appears from FIG. 5 the decoder memory is divided into five parts, KRM, ACM, ERM, EVM and FBM, each of which has a memory position for each of the incoming lines. The memory positions are addressed cyclically, and in time with the arrival on line MUB of the sampling values deriving from the respective subscriber lines, by means of address information on line ADB. The five parts of the memory correspond to as many logic parts KRL, ACL, ERL, EVL and FBL, which during each addressing step read in data from the memory position addressed in each part of the memory, carry out processing and rewrite data in the same memory position. The combination KRM/KRL corresponds to the clock pulse counter KR with control logic KL in FIG. 3, ACM/ACL corresponds to the accumulator AC with control logic AL, and ERM/ERL corresponds to the element counter ER with control logic EL and restoring logic RL. Of the other parts in FIG. 5 the combination EVM/EVL forms an element value register and FBM/FBL a flag bit register. The former is used for storage of the value of the respective character elements after each analysis cycle, the latter for indication that an analysis cycle has been completed, implying that an element value is stored. Each register has its own output, which in FIG. 5 have been given the common designation AKU, and on these outputs the information concerning the analysed character element is transferred to the control equipment SU shown in FIG. 1, in which, by means of the logic unit MBL of the receive buffer, the information is stored in the memory MBM in the memory position associated with the respective incoming subscriber's line as described earlier.

In accordance with the above, each of the five parts of the decoder memory has a memory position for each of the incoming lines. Together these five memory positions constitute a memory word, in which four bits have been allotted to part KRM, three bits each to parts ACM and ERM, and one bit each to part EVM and FBM. The logic units KRL, ACL, ERL may be made up of the same components as the device in FIG. 3, with the slight difference that the summation circuits SK 1, SK 2, SK 3 must be furnished with inputs for parallel read-in of the respective bits in the aforesaid memory word. The already shown parallel outputs are used for rewriting of processed data in the memory. The element value logic EVL contains a gate, corresponding to gate IL in FIG. 3, for writing of the binary value of the analysed element into the element value memory EVM, and a bistable flip-flop to which the element values are read out from the memory in time with the addressing of the respective memory words. To inform the control equipment SU that write-in in EVM memory has taken place, the binary value 1 is simultaneously written into the flag bit memory FBM through a direct connection to the write input of the memory from output 14 on the decoder AK 1. For read-out of this flag bit the flag bit logic FBL contains a bistable flip-flop which works in synchronism with the flip-flop in logic unit EVL.

Figure 6:
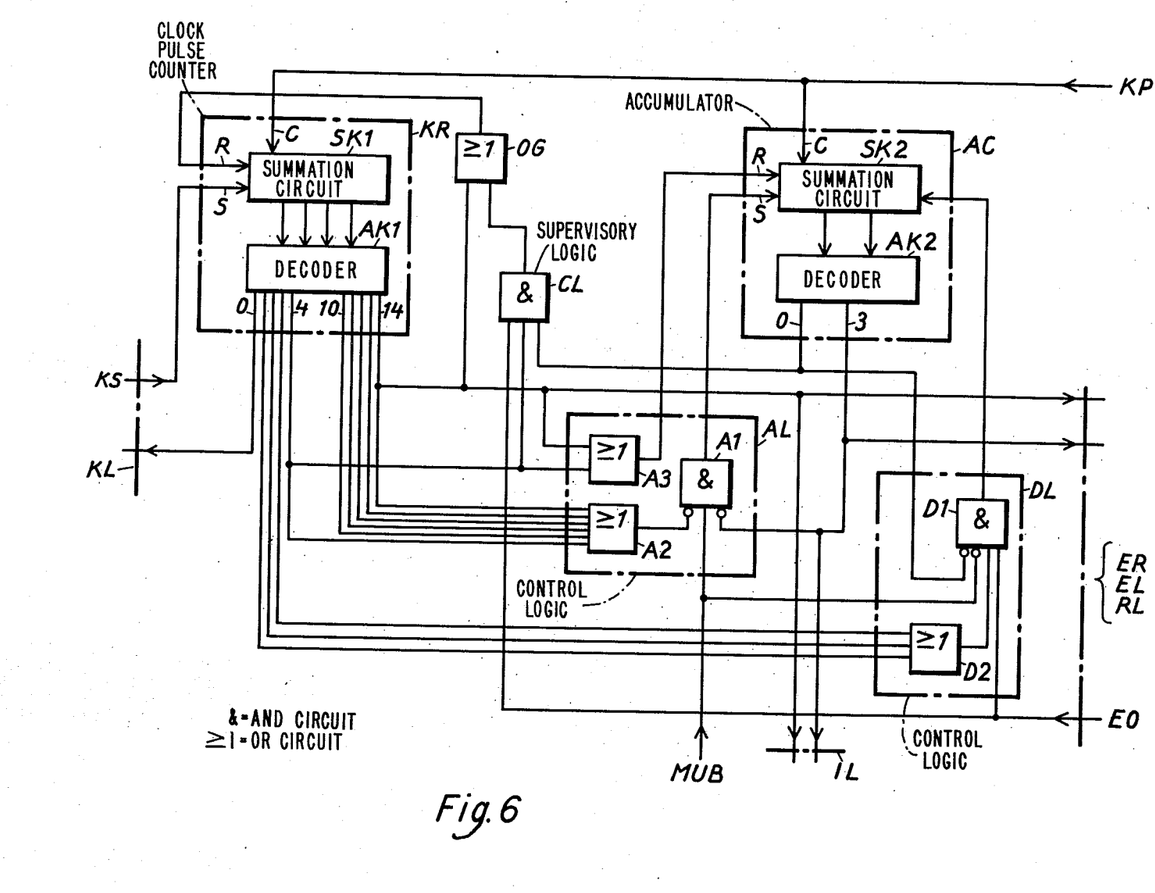
FIG. 6 shows details of FIG. 3 in accordance with the further development.

FIG. 6 shows an improved solution of the circuits specially framed or outlined in FIG. 3. The differences in relation to the device as described above consist principally in the addition of the logic circuits CL and DL. Other differences constitute essentially adaptations of the design to the conditions occasioned by these circuits. The decoder AK 1, for instance, has been supplemented by an additional number of outputs for decoded numbers and the summation circuit SK 1 has been provided with an OR gate OG before the restoring input to allow restoring also from the new circuit CL. In the new design the decoder AK 2 has outputs for decimal numbers 0 and 3, so that it has been possible at the same time to reduce the summation circuit SK 2 by one stage. Furthermore circuit SK 2 has been provided with a new control input D, which serves as alternative to input S and involves reversal of the summation circuit. In this way an addition of clock pulses KP takes place when input S has high level while D has low level, but a subtraction in the reverse case. The control logic AL performs in principle the same function as previously described but has been given a new form in that the OR gate A2 now has 6 inputs and the OR gate A3 has been added.

The supervisory logic CL consists of an AND gate with which the clock pulse counter KR can be restored after an initial analysis phase. The control logic DL, consisting of an AND gate D1 and an OR gate D2, has the function of reversing the accumulator AC when a subtraction is to be made in the accumulator AC during said initial analysis phase.

Figure 7:
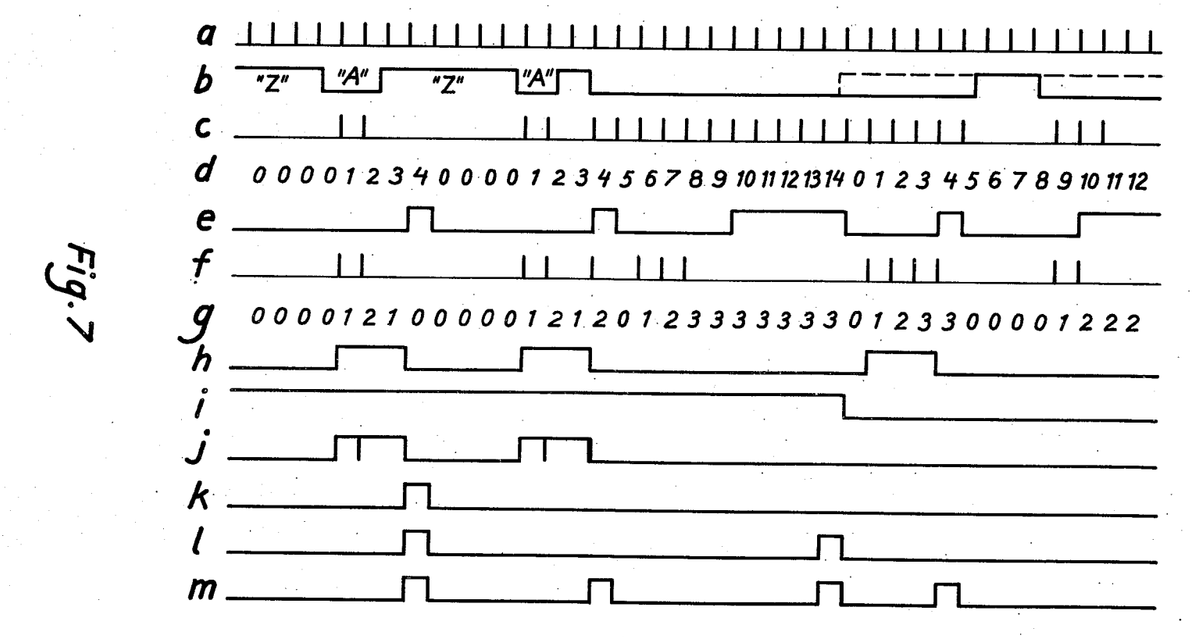
FIG. 7 shows a number of timing diagrams which illustrate the function of the device according to the further development.

The function operation is best explained by means of the timing diagram in FIG. 7 where, on line (a), are shown the clock pulses arriving on line KP and taken to input C on the three summation circuits. On line (b) is shown an example of a signal which, for example, arrives on a subscriber's line at a TELEX transit exchange, and on line (c) positive sampling pulses representing the binary value 1 which are synchronous with the clock pulses and occur in state A of the telex signal. These sampling pulses are delivered to the analysis device via line MUB and are there conducted to an input on each of the AND gates K1, A1 and D1. In contradistinction to the first two, the input on D1 is inverting, which implies that 1 pulses block this gate irrespective of the state on the other inputs, for which reason the output assumes the binary state 0. Consequently the control input D to the summation circuit SK 2 is not activated when 1 pulses occur on MUB. On the other hand the control input S may be activated if at the same time binary 0 is delivered to the two inverting inputs on gate A1.

In the rest position all summation circuits are zeroed, so that the decoders have a high level or binary 1 on their 0 outputs and a low level or binary 0 on the other outputs. All inputs on the OR gate A2 thus have a condition 0, which gives condition 0 to the left-hand input on A1. The right-hand one will have 0 directly from the decoder AK 2. In the same way the input S is activated on the summation circuit SK 1 from KL (via line KS in FIG. 3) by a positive sampling pulse in the manner earlier described. On line (d) the state of the clock pulse counter is shown after every clock pulse and, as is seen, the first pulse on line (c) starts counting in counter KR. None of the outputs 0–3 from decoder AK 1 is connected to gate A2, so that, as shown on line e), gate A1 receives 0 condition on its left-hand input during the first four clock pulse intervals and thus 1 pulses from input MUB are allowed to pass to input S on circuit SK 2. This is shown on line (f) in FIG. 7. Simultaneously with the first sampling pulse, circuit SK 2 is clocked from generator KP and advances to the numerical value 1 in accordance with line (g). OR gate D2 has connection to outputs 1–3 from decoder AK 1, so that the AND gate D1 will have one of its opening conditions fulfilled during clock pulse intervals 1–3 as shown on line h). Since, according to the start condition, the element counter is zeroed, so that, according to line i), binary 1 is received from the 0 output on decoder AK 3 (line ED in FIG. 3), and as, in accordance with the above, the accumulator AC has left the 0 position, so that low level is received from the 0 output on decoder AK 2, two additional opening conditions will be fulfilled for AND gate D1. At the next clock pulse from generator KP, however, a positive sampling pulse occurs, so that AND gate D1 is blocked during the pulse time. This is shown on line (j) in FIG. 7 according to which, accordingly, the control input D to the summation circuit SK 2 will have 1 state during the clock pulse intervals 1, 2 and 3 but briefly go to 0 during clock pulse 2. At the same time, as shown on line (f), a 1 pulse is received from AND gate A1 to control input S so that, as appears from line (g), the accumulator AC is advanced to numerical value 2, while the clock pulse counter KR, according to line (d), is also advanced to numerical value 2.

According to line (b) in FIG. 7 the binary signal returns to Z state during clock pulse interval 2 and remains there on the following six sampling occasions. As appears from line (c) the positive sampling pulses are now absent, which implies that the activation pulses from gate A1 are at the same time absent. See line (f).

Instead, according to line (j), gate D1 now provides the activation state, so that the summation circuit SK 2 is stepped back to 0 during the time in which circuit SK 1 advances to 4. See lines (d) and (g). In this position 1 state is received from output 4 on decoder AK 1 via gate A2 to one of the inverting inputs on gate A1, with the result that the latter blocks any 1 pulse occurring on the next sampling occasion. As already noted, circuit DL is activated only during the clock pulse inervals 1, 2 and 3 so that, as shown on line (j), the activation signal to input D on SK 2 also has 0 state. Output 4 from decoder AK 1 is also connected to an input on each gate CL and A1. The AND gate CL has 1 condition also on the other inputs, since the element counter is still in position 0 and the accumulator AC has just gone to position 0, so that the output from circuit CL and thus input R on circuit SK 1 will have 1 condition as shown on lines (k) and (l) respectively. Gate A1 is an OR gate, so that the signal simply passes to input R on circuit SK 2 as shown on one line (m). As a result of this, both counter KR and accumulator AC are zeroed by the next clock pulse so that, in accordance with FIG. 7, the analysis device returns to rest position.

After a number of clock pulse intervals positive sampling pulses occur once again, according to line (c), on input line MUB to the analysing device, corresponding to a new A state of the signal as on line (b). This switch to the A state marks the beginning of a start element associated with a TELEX character arriving on the subscriber's line. On this occasion as well a return takes place to Z state after a couple of sampling pulses but only during a short time, so that the content of the accumulator AC is not 0 when the clock pulse counter reaches position 4. According to line (g) the numerical value is 2. While gate A3 according to line (m) again passes a restore signal to the summation circuit SK 2, gate CL is now blocked so that, according to lines (k) and (l), no restore signal reaches circuit SK 1. As from clock pulse interval 5, accordingly, the accumulator AC restarts from 0.

During the interval 5–9, 0 state is obtained according to line (e) from gate A2, so that positive sampling pulses can be accumulated by circuit SK 2. When the latter has reached the numerical value 3, however, the counting is interrupted through the fact that the right-hand input to gate A1 has a high level and thus the activation signal according to line (f) remains low. This is attained already in interval 8, since the stepping has proceeded without interruption. Maximally 2 sampling pulses may fail to appear during the indicated interval 5–9 without affecting the result. During the remaining clock pulse intervals 10–14 the accumulator is blocked since 1 state arrives at the gate A2 from one of outputs 10–14 on the decoder AK 1.

In position 14, as appears from lines (l) and (m) in FIG. 7, activation signals are received by the R inputs on the summation circuits SK 1 and SK 2. At the same time activation signals are transmitted to read-out gate IL and to the element counter ER. In the manner earlier described counter KR and accumulator AC are zeroed and at the same time the state of the accumulator is read out and the element counter is stepped to 1. The state on line EO will now according to line (i), be 0, so that gates D1 and CL will thereafter be blocked. The accumulator AC can thus not be reversed and the clock counter KR cannot be zeroed in position 4.

On line (b) is shown that the data element with Z polarity following the start element has been so heavily distorted that the accumulator has first been able to advance to 3 before it is restored to 0 by clock pulse 5 and thereafter advanced to 2 once again during the summation interval 5–9. Since, according to the preceding account, the accumulator must attain the numerical value 3 for A state to be indicated in the read-out in position 14, the Z pulse in this case accordingly will be correctly interpreted.

We claim:
1. Apparatus for indicating the binary value of a data element which is represented by a signal switching from a first state to a second state and, after a duration of time, switches from the second state to the first state, said apparatus comprising: sampling pulse generating means adapted to receive a data element for generating sampling pulses periodically recurring at a rate such that a plurality of such pulses should occur while the signal representing the data element is in the second state, said means having output means for transferring such sampling pulses only while the signal representing the data elements is in the second state; sensing means for indicating the transition of the signal representing the data element from the first state to the second state; time interval generating means connected to said sensing means and activated thereby for generating a time interval related to a nominal duration of time the signal representing the data element should be in the second state; counting means for counting the number of sampling pulses transferred from said sampling pulse generating means only when the signal representing the data element is in the second state; and binary value signal transmitting means connected to said counting means and said interval generating means for transmitting a particular binary value indicating signal at the end of the time interval generated by said interval generating means only if the number of sampling pulses counted by said counting means during said time interval is greater than a certain value.

2. In a switching exchange for the transfer of signals representing asynchronous data with a known nominal signalling rate and a character structure such that each character has a start element and a number of data elements, said data elements being at either a first or second binary level and lasting for a nominal time interval, wherein the exchange has a source of clock pulses having a repetition rate a number of times higher than the signalling rate and means for sampling the elements by sampling pulses occurring in synchronism with the clock pulses, said transmitting means having an output for first sampling pulses only when the element being sampled is at said first binary level, apparatus for determining the binary informational contents of the data elements comprising: first control logic means for indicating the start of an element; a cyclically operating clock pulse counter means having a first summation means for counting the number of clock pulses occurring during said nominal time interval and a first decoder means connected to said rirst summation means, said first summation means being activated to count by said first control logic means, said first decoder means having a first output for emitting a first signal when said first summation means has counted a first number of clock pulses and a second output for emitting a second signal when said first summation means has counted a second and greater number of clock pulses; second control logic means having an input for receiving sampling pulses, an output for transmitting sampling pulses and control input means, connected to the first and second outputs of said first decoder means, for controlling the transfer of sampling pulses from said input to said output to a time interval occurring between said first and second counts of the clock pulses by said first summation means; an accumulator means having a second summation means with an input connected to the output of said second control logic means for counting the number of first sampling pulses received from said second control logic means and a second decoder means having inputs connected to said second summation means and an output for indicating when said second summation means has counted a given number of first sampling pulses; and a read-out means having a first input connected to the second output of said first decoder means and a second input connected to the output of said second decoder means for generating a binary value indicating signal in accordance with the number of the first sampling pulses counted by said accumulator means during a time interval determined by said clock pulse counter means.

3. The apparatus of claim 2 further comprising element counter means controlling said clock pulse counter means to generate a predetermined number of said nominal time intervals after the initial activation of said clock pulse counter means, said predetermined number being related to the number of data elements in a character.

4. The apparatus of claim 3 wherein said element counter means includes a third summation means having an input connected to said clock pulse counter means for counting each cycle performed by said clock pulse counter means and a third decoder means connected to said third summation means and having outputs for indicating the number of cycles performed by said clock pulse counter means.

5. In a switching exchange for the transfer of signals representing asynchronous data with a known nominal signalling rate and a character structure such that each character has a start element and a number of data elements, said data elements being at either a first or second binary level and lasting for a nominal time interval, wherein the exchange has a source of clock pulses having a repetition rate a number of times higher than the signalling rate and means for sampling the elements by sampling pulses occurring in synchronism with the clock pulses, said means having an output for transmitting first sampling pulses when the element being sampled is at said first binary levels and second sampling pulses when the element being sampled is at said second binary level, apparatus for determining the binary informational contents of the data elements comprising: first control logic means for indicating the start of an element; a cyclically operating clock pulse counter means having a first summation means for counting the number of clock pulses occurring during said nominal time interval and a first decoder means connected to said first summation means, said first summation means being activated to count by said first control logic means, said first decoder means having means for emitting output signals related to the instantaneous number of clock pulses counted by said first summation means; second control logic means having an input for receiving sampling pulses, an output for transmitting sampling pulses and control input means, connected to the outputs of said first decoder means, for controlling the transfer of sampling pulses from said input to said output; an accumulator means having an up-down counter means with an input connected to the output of said second control logic means for up-counting the number of first sampling pulses received from said second control logic means and for down-counting the number of second sampling pulses received from said second control logic means and a second decoder means having inputs connected to said second summation means and a first output for indicating when said second summation means has counted a given number of the first sampling pulses and a second output for indicating when said second summation means has counted more of the second sampling pulses than the first sampling pulses; a read out means having a first input connected to the second output of said first decoder means and a second input connected to the first output of said second decoder means for generating a binary value indicating signal in accordance with the number of the first sampling pulses counted by said accumulator means during a time interval determined by said clock pulse counter means; and supervisory logic means connected to said first and second decoder means for restoring said clock pulse counter means when said second decoder means indicates that there have been a majority of the second sampling pulses before said first decoder means indicates that a predetermined number of clock pulses have been counted.

* * * * *